Dec. 16, 1947.  E. C. HORTON  2,432,895
ADJUSTABLE MOTOR VEHICLE SEAT
Original Filed Jan. 2, 1943  2 Sheets-Sheet 2
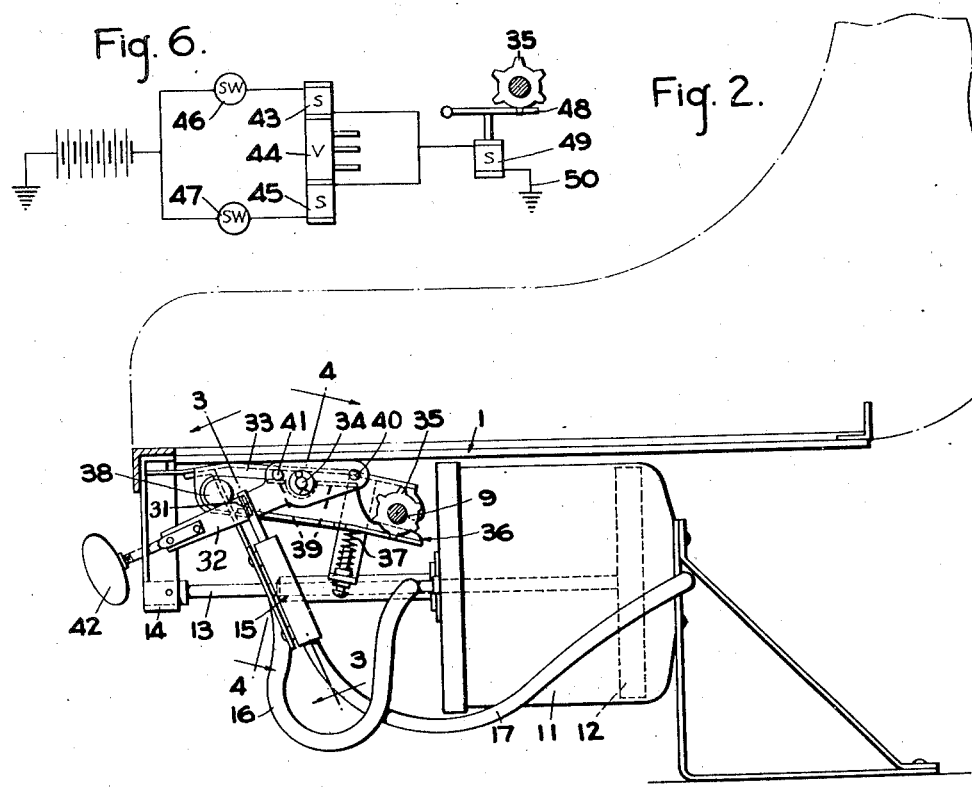
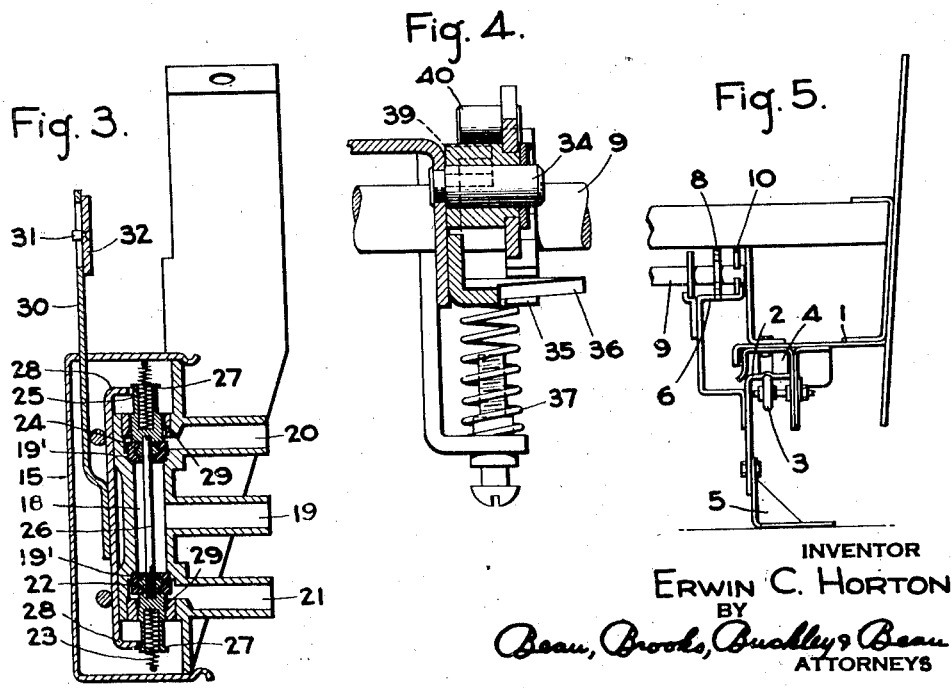
INVENTOR
ERWIN C. HORTON
BY
Bean, Brooks, Buckley & Bean.
ATTORNEYS Patented Dec. 16, 1947

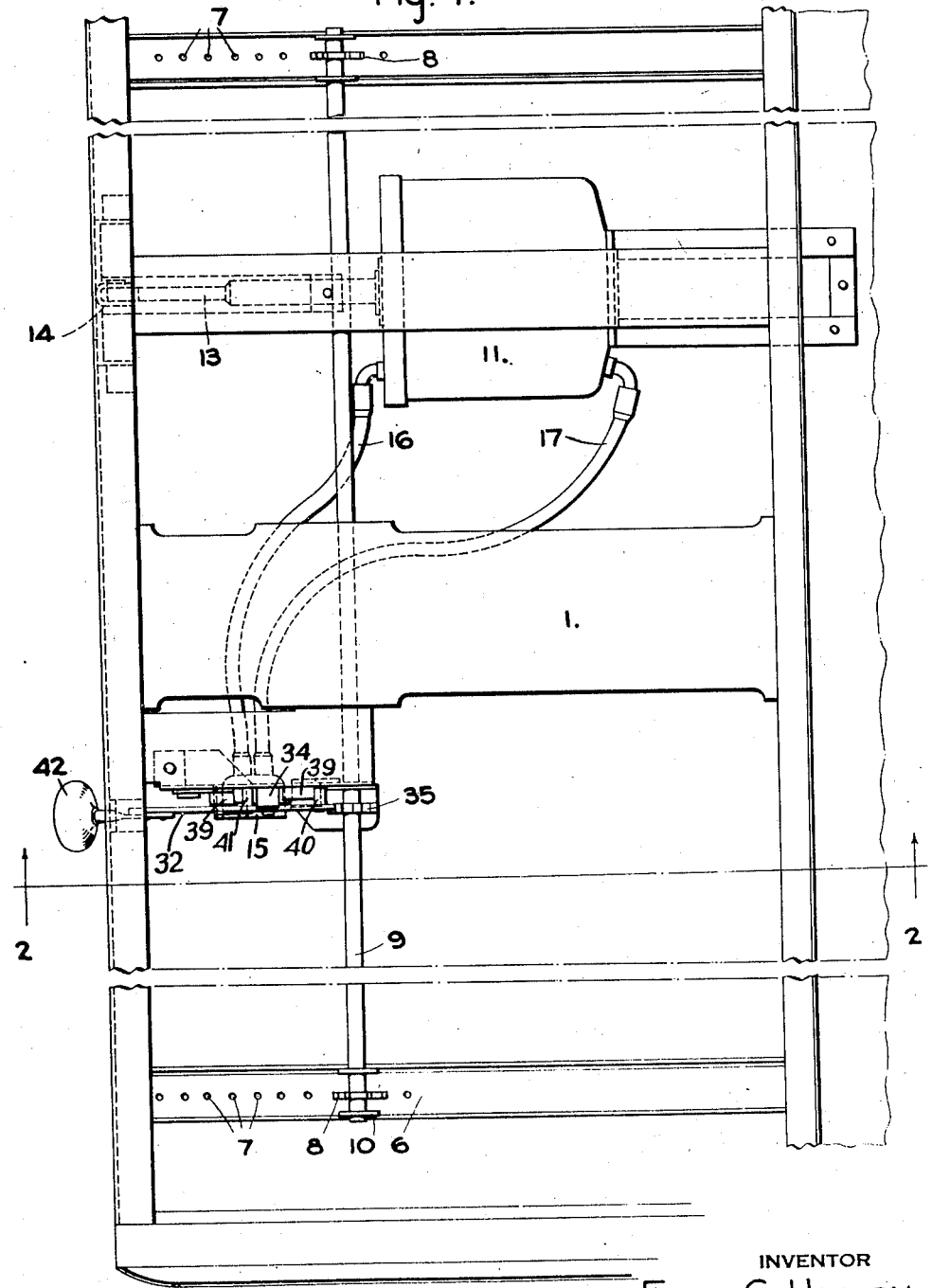

2,432,895

UNITED STATES PATENT OFFICE 2,432,895

ADJUSTABLE MOTOR VEHICLE SEAT

Erwin C. Horton, Hamburg, N. Y., assignor to Trico Products Corporation, Buffalo, N. Y.

Original application January 2, 1943, Serial No. 471,148. Divided and this application October 9, 1944, Serial No. 557,771

5 Claims. (Cl. 155—14)

This invention relates to the motor vehicle art and primarily to vehicle seats.

The object of the present invention is to provide a power operated seat adjustment by which the seat may be readily adjusted in an efficient manner and with the least effort on the part of the occupant. The invention further resides in a seat adjustment mechanism which may readily be operated to bring the seat to the desired location with respect to the vehicle controls, in a most practical and facile manner.

A further object of the invention is to provide a power adjustment for a seat in which means are provided for automatically securing the seat in its adjusted position against manual movement away from the vehicle controls and yet will permit the seat to be manually adjusted when desired.

In the accompanying drawings:

Figure 1 is a fragmentary bottom plan view of a seat mounting having the improved power adjustment;

Fig. 2 is a sectional view thereof about on line 2—2 of Fig. 1;

Fig. 3 is a detailed sectional view of the control valve, taken about on line 3—3 of Fig. 2;

Fig. 4 is a transverse detailed sectional view through the seat latching means as seen from the plane of line 4—4 of Fig. 2;

Fig. 5 is a detailed view depicting a slidable support for the seat; and

Fig. 6 is a diagrammatic illustration of a further modified form of the invention showing the seat control valve and lock electrically operated.

Referring more particularly to the drawing, the seat has an under frame 1 suitably supported on a track 2 by the antifriction rollers 3 and 4. The track is supported by a bracket 5 above the floor of the vehicle, and fixedly related to the track at each side of the seat is a rack rail 6 having a series of apertures 7 engaged by a pinion 8. The pinions are fixed to the opposite ends of a transverse shaft 9 to rotate therewith and cooperate in equalizing the seat movement for insuring a well guided movement, the shaft being supported from the under frame 1 by journal bearing brackets 10.

The power means for adjusting the seat comprises a chamber 11 having a piston 12 connected by a piston rod 13 to a bracket part 14 depending from the forward edge of the seat. As shown in Fig. 1, the fluid motor may be disposed off-center, in a convenient location toward one side of the seat, this being permitted by reason of the motion equalizing guiding action of the rack and pinion construction just described.

The control valve 15 is connected by branch conduits 16 and 17 to the motor chamber at opposite sides of the piston, the valve having a suction chamber 18 connectible to a source of pressure supply by the nipple 19. The chamber 18 opens at opposite ends through valve seats 19' into nipples 20 and 21 which in turn are connected to the branch conduits 16 and 17. A valve 22 is normally engaged with one of the seats 19' under the urge of the spring 23 while a second valve 24 is normally held on its seat by a spring 25, the latter valve being guided on a stem 26 which is fixedly carried by the valve 22. Consequently, the two valves are mutually held and guided in the chambered valve housing. The stem of each valve part 22, 24 is provided on its outer end with a shoulder 27 which slidably engages a finger 28 for lifting the valve from its normally engaged seat to an opposed atmospheric seat 29. Normally the seats or ports 29 are open to vent the piston chamber 11 at opposite sides of the piston and when either valve is lifted from the its pressure port to a position closing the companion atmospheric port the operating pressure will act through the connected motor passage and unbalance the pressure in the motor chamber to operate the piston. Upon the release of the finger 28 the corresponding valve spring 23 (25) will close the pressure communication and vent the fluid motor to the atmosphere to balance the piston.

The two fingers 28 are connected to an arm 30 which in turn is connected by a pin and slot connection 31 to an operating lever 32 which in turn is pivotally mounted on a frame member 33 by a pin 34, the pin and slot connection providing a play or lost motion arrangement by which the lever can have an idle movement in either direction from a neutral position. This idle motion is utilized for unlocking the seat for movement preliminary to the motor operation and to this end there is fixed on the transverse motion equalizing shaft 9 a keeper in the form of a toothed wheel 35 with which engages a latch member 36 under the urge of a spring 37. The latch is pivotally mounted on the frame member 33 by a pin 38 and is formed with track portions 39 at opposite sides of the pivot pin 34 for the lever 32. The control lever is provided with pins 40 and 41 extending laterally from the lever at opposite sides of the fulcrum 34 and in overlying relation to the track portions 39, the arrangement being such that during the idle movement of the control lever from its neutral position either one of the pins 40 or 41 will depress the latch 36 out of engagement with the toothed wheel 35 and thereby free the seat for motor actuation, which follows upon continued movement of the control lever to actuate the corresponding one of the valves.

The control lever is conveniently located at an accessible point. In Fig. 2 it is shown as projecting forwardly from the seat and provided with a knob 42 within easy reach of the seat occupant. Upon lifting the knob 42 the pin 40 will disengage the latch 36 from its wheel and then lift upon the valve 24 to open communication between the pressure source and the forward end of the motor chamber, causing a pressure differential to move the piston and the connected seat forwardly. Upon the release of the knob 42 the valve 24 will close and the spring 37 will latch the seat in the given position. Depression of the knob 42 will cause the pin 41 to swing the latch from the toothed wheel 35 and then unseat the valve 22 to establish pressure communication with the motor chamber at the rear side of the piston 12 for moving the seat rearwardly.

In Fig. 6 there is diagrammatically illustrated an electrical control as a substitute for the hand operated lever 32 in Figs. 1 and 2. To this end there is provided a solenoid 43 associated with the upper valve in the housing 44 and a like solenoid 45 operatively related to the lower valve in the housing so that upon the closing of the circuit by either one of the switches 46 or 47 the solenoid will act to withdraw the valve from its pressure port to a position for closing the normally opened atmospheric port. The valves in the housing may be similar to valves 22 and 24 in Fig. 3. The toothed wheel 35 has its latch 48 released by a solenoid 49 which is connected by the circuit wiring 50 for operation upon closing of either of the switches 46 or 47. By this arrangement the latch will be rendered inoperative upon the actuation of either valve to free the seat for motor operation.

From the foregoing it will be observed that adjustment of the seat forwardly or rearwardly may be effected in an easy manner and with the least effort on the part of the occupant. The arrangement is practical and efficient, causing the seat to be locked automatically whenever the motor is inoperative, and while the foregoing description has been given in detail for clarity and ease of understanding the invention, it is not the intention thereby to restrict the invention since the inventive principles herein involved are capable of assuming other physical embodiments without departing from the spirit of the invention or the scope defined in the appended claims.

What is claimed is:

1. A motor vehicle having a seat, means supporting the same for fore and aft adjustment, a fluid motor operatively related to the aforesaid elements to adjust the seat on its supporting means, a lock operatively related to the first two elements to secure the seat against adjustment on the supporting means, a valve connected for regulating the admission of fluid under pressure to the motor, and a lever having a play connection with the valve for controlling the operation of the motor, said lever having a part acting on the lock to unlock the seat during the play functioning.

2. A motor vehicle having a seat, means adjustably supporting the seat and including a pair of side rack rails and a shaft carrying terminal pinions intermeshing with the rack rails to guide the seat during its adjustment, power means carried by one and reacting on the other of the first two named elements for adjusting the seat, lock means engageable with a shaft carried part to lock the pinions against riding on the rails, and control means operable first to unlock the seat and then actuate the power means, and upon release of the control means to arrest the power means and then re-lock the seat.

3. A motor vehicle having a support, a seat mounted thereon for back and forth movement, motion equalizing means cooperating with the seat and its support for guiding the seat in such movement and including a shaft journaled on the seat and rotatable by and during such seat movement, a toothed wheel fixed on the shaft, a latch pivoted on the seat for movement to and from a position of interengagement with the toothed wheel for locking the seat stationary, power means connecting the support to the seat for adjusting the latter, a control on the seat for regulating the power means, and a lever pivoted on the seat and having a play connection with the control and also having a pair of lugs one on each side of the lever fulcrum arranged to alternately engage the latch to release the seat during the movement permitted by such play connection prior to actuation of the control.

4. A motor vehicle having a support, a seat mounted thereon for back and forth movement in a straight line, motion equalizing means cooperating with the seat and its support for guiding the seat in such straight line movement and including a shaft journaled on one of the first two elements and having its opposite ends geared at spaced points to the other element for rolling contact thereon by and during such seat movement, seat locking means movably mounted on said one of the first two elements and detachably engaging the shaft to hold it against rotating, a fluid motor connecting the support to the seat off center and independently of the equalizing means to adjustably move the seat as directed by the latter, a valve connected to the motor to start and stop the motor, and a common control operatively associated with the locking means and with the valve for acting thereon successively to render the locking means ineffective and to move the valve to a motor starting position.

5. A motor vehicle having a support, a seat mounted thereon for back and forth movement in a straight line, motion equalizing means cooperating with the seat and its support at opposite sides of the seat for guiding the seat in such straight line movement and including a shaft journaled on the seat and having rolling contact on the support by and during such seat movement, seat locking means detachably engaging the shaft to lock the same against turning and thereby arrest the seat, a fluid motor reacting between the seat and the support independently of the equalizing means to adjustably move the seat as guided by the latter, a valve on the seat and connected to the motor to start and stop the latter, and manual means on the seat connecting with the valve and the locking means to render the latter ineffective and thereafter to move the valve to a motor starting position.

ERWIN C. HORTON.

REFERENCES CITED

The following references are of record in the file of this patent:

UNITED STATES PATENTS

| Number | Name | Date |
|---|---|---|
| 975,705 | Melchior | Nov. 15, 1910 |
| 1,364,882 | Koken | Jan. 11, 1921 |
| 1,267,130 | Skeith et al. | May 21, 1918 |
| 2,235,239 | Saunders | Mar. 18, 1941 |
| 2,242,247 | Grant | May 20, 1941 |
| 2,283,761 | Richter | May 19, 1942 |
| 2,174,636 | McGregor | Oct. 3, 1939 |